US012811887B2

(12) United States Patent
Sreevalsan et al.

(10) Patent No.: US 12,811,887 B2
(45) Date of Patent: Nov. 24, 2026

(54) SYSTEM AND METHOD FOR CLASSIFYING TUNNELED NETWORK TRAFFIC

(71) Applicant: Sandvine Corporation, Waterloo (CA)

(72) Inventors: Shyam Sreevalsan, Bengaluru (IN); Ousef Kuruvilla, Bangalore (IN); Rajeswara Rao Muthyala, Bengaluru (IN)

( * ) Notice: Subject to any disclaimer, the term of this patent is extended or adjusted under 35 U.S.C. 154(b) by 510 days.

(21) Appl. No.: 17/945,680

(22) Filed: Sep. 15, 2022

(65) Prior Publication Data

US 2023/0092372 A1 Mar. 23, 2023

(30) Foreign Application Priority Data

Sep. 17, 2021 (IN) ............................ 202111042053

(51) Int. Cl.
*H04L 47/2441* (2022.01)
*H04L 41/14* (2022.01)
(Continued)

(52) U.S. Cl.
CPC ........ *H04L 47/2441* (2013.01); *H04L 41/142* (2013.01); *H04L 41/145* (2013.01); *H04L 41/147* (2013.01); *H04L 43/022* (2013.01); *H04L 43/026* (2013.01); *H04L 43/062* (2013.01); *H04L 43/0876* (2013.01);
(Continued)

(58) Field of Classification Search
CPC ... H04L 47/2441; H04L 47/27; H04L 41/147; H04L 43/022; H04L 43/0876; H04L 43/16; H04L 41/142; H04L 43/026; H04L 43/062; H04L 47/24; H04L 41/145
See application file for complete search history.

(56) References Cited

U.S. PATENT DOCUMENTS 10,320,813 B1 * 6/2019 Ahmed ............... H04L 63/1416
2014/0310396 A1 10/2014 Christodorescu et al.
(Continued)

OTHER PUBLICATIONS

Islam et al. "VoIP Traffic Detection in Tunneled and Anonymous Networks Using Deep Learning", https://ieeexplore.ieee.org/stamp/stamp.jsp?tp=&arnumber=9406580 (Year: 2021).*
(Continued)

*Primary Examiner* — Angela Widhalm De Rodriguez
(74) *Attorney, Agent, or Firm* — Amarok IP Inc.; Neil W. Henderson

(57) ABSTRACT

A method for classifying tunneled network traffic including: providing at least one model configured to classify network traffic; retrieving a plurality of packets from a traffic flow; determining input and output statistics of the traffic flow based on the plurality of packets; and classifying, via the at least one model, the traffic flow based on the input and output statistics. A system for classifying tunneled network traffic including: a model making module configured to provide at least one model configured to classify network traffic; a packet processing engine configured to retrieve a plurality of packets from a traffic flow; a data collection module configured to determine input and output statistics of the traffic flow based on the plurality of packets; and a classification module configured to classify, via the at least one model, the traffic flow based on the input and output statistics.

18 Claims, 5 Drawing Sheets

(51) Int. Cl.

| | |
|---|---|
| ***H04L 41/142*** | (2022.01) |
| ***H04L 41/147*** | (2022.01) |
| ***H04L 43/022*** | (2022.01) |
| ***H04L 43/026*** | (2022.01) |
| ***H04L 43/062*** | (2022.01) |
| ***H04L 43/0876*** | (2022.01) |
| ***H04L 47/24*** | (2022.01) |
| ***H04L 47/27*** | (2022.01) |
| *H04L 43/16* | (2022.01) |

(52) U.S. Cl.
CPC .............. *H04L 47/24* (2013.01); *H04L 47/27* (2013.01); *H04L 43/16* (2013.01)

(56) References Cited

U.S. PATENT DOCUMENTS

2020/0382385 A1 12/2020 Vasseur et al.
2023/0164043 A1* 5/2023 Sirov .................. H04L 41/5032 709/224

OTHER PUBLICATIONS

Islam et al. "VoIP Traffic Detection in Tunneled and Anonymous Networks Using Deep Learning", https://ieeexplore.ieee.org/stamp/stamp.jsp?tp=&arnumber=9406580&tag=1 (Year: 2021).*
European Search Report, European Patent Office, on corresponding EP Application No. 22195974.5, dated Jan. 25, 2023.
Islam Faiz UL et al: "VoIP Traffic Detection in Tunneled and Anonymous Networks Using Deep Learning", IEEE Access, IEEE, USA, vol. 9, Apr. 19, 2021 (Apr. 19, 2021), pp. 59783-59799, XP011851248, DOI: 10.1109/ACCESS.2021.3073967.
Shi Yan et al: "Source identification of encrypted video traffic in the presence of heterogeneous network traffic", Computer Communications, Elsevier Science Publishers BV, Amsterdam, NL, vol. 129, Jul. 26, 2018 (Jul. 26, 2018), pp. 101-110, XP085477960,ISSN: 0140-3664, DOI: 10.1016/J.COMCOM.2018.07.019.

* cited by examiner

SYSTEM AND METHOD FOR CLASSIFYING TUNNELED NETWORK TRAFFIC

RELATED APPLICATION

The present disclosure claims priority to Indian Patent Application No. 202111042053 filed Sep. 17, 2021, which is hereby incorporated herein in its entirety.

FIELD

The present disclosure relates generally to handling of computer network traffic. More particularly, the present disclosure relates to a system and method for classifying and handling tunneled network traffic.

BACKGROUND

Network operators and ISPs are concerned that increasing adoption of VPN (Virtual Private Networks) impacts the visibility that network operators have into their networks in terms of what applications are being used. When VPNs are in use, the traffic tunneled within the VPN is generally either just identified as VPN traffic or it could actively be obfuscated by the VPN service and masqueraded to look like other applications. With the rise of work from home (COVID-19 influenced and otherwise), the usage of VPNs has seen a global up tick, at the same time VPNs are also increasingly being used to circumvent regulations and legal restrictions, as well as to obfuscate pirate activity that can violate content copyright. One commonly seen example is illegal pirate Internet Protocol Television (IPTV) services who actively promote VPN usage among their consumers—in some cases by creating their own VPN services or by partnering with other VPN providers.

Further, ISPs have noted other tunneled traffic that also lacks visibility to the ISP. The impact of this for network operators and ISPs is that they no longer have visibility into the applications that are being transmitted over the networks they host. This situation can lead to a variety of problems and inefficiencies. Without knowing what applications are in use, managing the network efficiently becomes problematic. Different applications such as video streaming, gaming, P2P (peer to peer), VoIP (Voice over IP) and others have very different requirements and ensuring a high QoS (Quality of Service) for their users without knowing what applications are in use puts network operators in a difficult situation. ISPs are also at a loss when it comes to preventing illegal activity that happens over VPNs as they lack the visibility to prevent it.

Content providers such as TV and Video producers whose content is being pirated and sold in an unlicensed and often illegal manner are also impacted by the increased VPN usage as this prevents them from even obtaining statistics on how much fraud is happening or who is committing the fraud. This prevents content providers from taking the appropriate legal routes to prevent piracy.

As such, there is a need for an improved system and method for classifying tunneled network traffic.

The above information is presented only to assist with an understanding of the present disclosure. No determination has been made, and no assertion is made, as to whether any of the above might be applicable as prior art with regard to the present disclosure.

SUMMARY

In a first aspect, there is provided a method for classifying computer network tunneled traffic including: providing at least one model configured to classify network traffic; retrieving a plurality of packets from a traffic flow; determining input and output statistics of the traffic flow based on the plurality of packets; and classifying, via the at least one model, the traffic flow based on the input and output statistics of the traffic flow.

In some cases, the method may further include providing traffic management action to the traffic flow based on the classification.

In some cases, the traffic may be VPN traffic.

In some cases, determining input and output statistics may include determining the packet count and size in bytes of the plurality of packets.

In some cases, determining input and output statistics may include determining the bytes in and bytes out for the plurality of packets.

In some cases, determining input and output statistics may be done over a prediction interval.

In some cases, the model may be built using machine learning.

In some cases, the model may be built using raw data associated with a plurality of known traffic flows.

In some cases, the model may be built using features associated with a plurality of known traffic flows.

In another aspect, there is provided a system for classifying computer network tunneled traffic including: a model making module configured to provide at least one model configured to classify network traffic; a packet processing engine configured to retrieve a plurality of packets from a traffic flow; a data collection module configured to determine input and output statistics of the traffic flow based on the plurality of packets; and a classification module configured to classify, via the at least one model, the traffic flow based on the input and output statistics of the traffic flow.

In some cases, the classification module may be configured to provide traffic management action to the traffic flow based on the classification.

In some cases, the data collection module may be configured to determine input and output statistics comprise determining the packet count and size in bytes of the plurality of packets.

In some cases, the data collection module may be configured to determine input and output statistics comprise determining the bytes in and bytes out for the plurality of packets.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides a method and system for classifying tunneled network traffic. Examples of the system and method often are shown using VPN traffic but would generally function similarly with other types of tunneled traffic, including for example, HTTP proxies, iCloud private relay and the like. Embodiments of the system and method are configured to detect tunneled or VPN traffic and subject this traffic to deeper analysis in order to heuristically ascertain what applications are being transmitted over the VPN tunnel.

Embodiments of the system and method disclosed herein are intended to provide for tunneled traffic classification based on periodic sampling of tunneled traffic flow data. Where a traffic flow can be defined as a sequence of packets from a source to a destination in a computer network, the traffic flow may also be defined as an artificial logical equivalent to a call or connection.

Embodiments of the system and method are intended to be able to periodically predict over a lifetime of a tunneled traffic flow what application is being transmitted over, for example, the VPN, what application is associated with the traffic flow. A user's behavior behind a tunnel may likely encompass multiple activities and embodiments of the system and method may perform periodic predictions to provide more accurate temporal classification. If a plurality of activities is happening simultaneously then embodiments of the system and method can be configured to attempt to predict, for example, the mixture of applications, the dominant application in terms of bytes used, or the like.

Embodiments of the system and method are intended to provide information related to what application or application category the user's traffic flow(s) belong at that point in time within the tunnel. Embodiments of the system and method may further determine traffic actions for various traffic flows that have been classified by, for example, application, application type, or the like.

Figure 1:
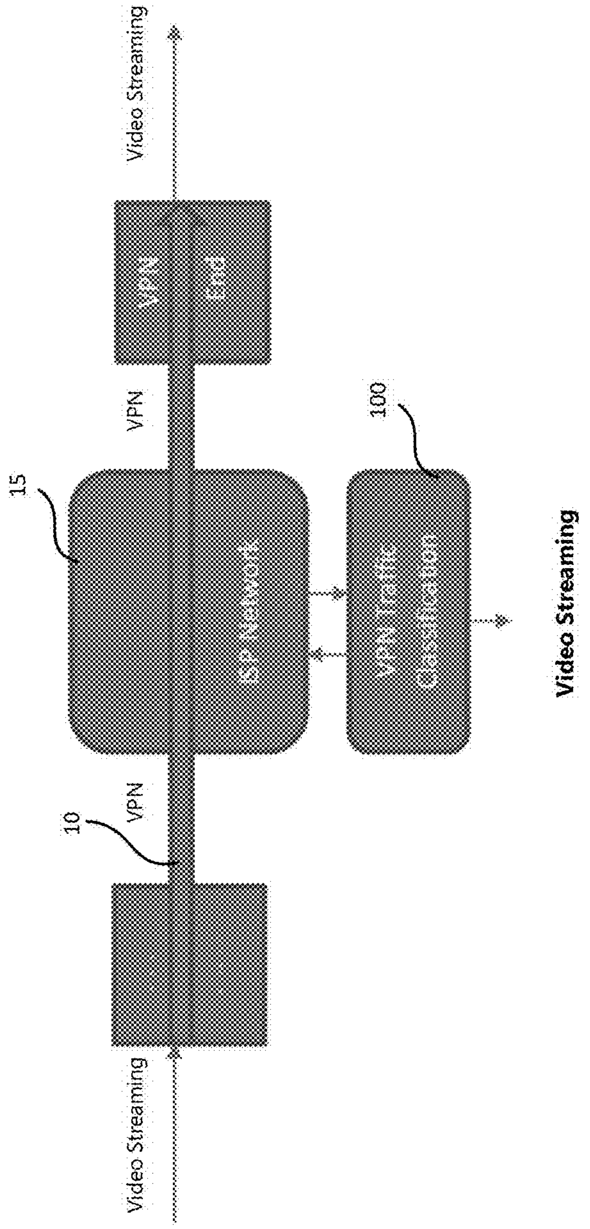
FIG. 1 illustrates an environment for VPN traffic.

FIG. 1 illustrates an environment for an embodiment of the system. Traffic flows, for example, video streaming flows, enter a VPN tunnel 10 and, because of the tunnel 10, are obfuscated to the ISP network 15. Conventionally, the traffic flow may have been identified as VPN or in the traffic flow may have been unidentified or incorrectly identified if the VPN service allowed for active masquerading. The traffic flow would then leave the VPN Tunnel and reach its destination. The system 100 is intended to reside within the ISP network 15 and use a pre-trained supervised machine learning model to analyze VPN traffic flows and determine or predict what application is being transmitted over the VPN.

Embodiments of the system are intended to classify VPN traffic flows into various categories, for example; Video Streaming; Voice over IP; Web Browsing; Peer to Peer; Data Transfer (Download, Upload), and the like. VPN traffic flows may also be classified into a mixture of application categories, for example: Web Browsing+Voice over IP, or the like. VPN traffic flows may also be classified as a specific application, for example: Netflix, YouTube, or the like. The level of classification may depend on the use-case, for example if the use-case is traffic optimization during periods of congestion then it may be preferable to identify the categories such as Video Streaming, Peer-to-Peer, or the like. If the use-case is application visibility and understanding, the name of the service may be identified and the application name may be preferred.

In some cases, the system is configured to determine or create at least one machine learning model to perform inference on a VPN flow, categorizing the flow into one of several categories or classifications. While it may not be necessary to train such a model using flows that have been collected behind a VPN connection, a sample of such data may be used to validate various assumptions made while training the model.

In particular, as an example, the throughput of a VPN flow, wherein a subscriber performs certain application activities and/or behaviors as a function of time would have similar characteristics to the total throughput for a given subscriber performing the same application activities and/or behaviors as a function of time had the traffic not been tunneled traffic, such as through a VPN.

To model the generic characteristics of the traffic classifications, captures may be taken for various applications belonging to the traffic categories that are to be modelled by the system. Obtaining data for the predictions of the following categories may require conformity to various assumption.

The traffic categories to be modelled are intended to have within them popular applications that demonstrate throughput characteristics that are observable over various applications that fall in that category. At the time of building the model, popular applications may include those applications that appear to have significant use in terms of subscription, bandwidth usage and global trends. For example, Netflix may use considerable bandwidth and is often one of the top ten applications in terms of bandwidth usage. As such, the system is generally configured to include Netflix data in the training data for the model.

This implies that if an application of a specific traffic category has not been included in the training data, the traffic category that the system may model may be able to catch that application based on the flow characteristics over a fixed interval of time in order to validate the generalizability of the model. As such, the model is intended to be configured to identify applications not used in the training model. In a specific example, application flows from Netflix, Hulu and YouTube may be used as a training dataset marked as streaming services. Once trained, the model is intended to be able to classify other video streaming applications (for example, HBO Max) as streaming applications. It will be understood that during the model validation, other applications not used as training data may be used.

The system is intended to review all or at least some of the traffic that is tunneled through a VPN for similar tunneled traffic. Traffic tunneled through VPN has been noted that this traffic tends to be long lived flows containing a variety of application activities and/or behaviors and can be active parallel and/or sequentially over the lifetime of the flow. The model is configured to infer the traffic flow classification on, for example, fixed intervals of time. An activity or behavior can be defined as the combination of applications the user is using over their Internet connection at any given point. For example, a user may be editing a file in Google Docs while on a Zoom call simultaneously.

The data that may be used to validate the at least one model produced by the system and is also intended to validate the assumptions regarding the traffic flows. To validate, the system may be configured to retrieve a sample of captures taken wherein the client is connected to a VPN as is the real-world use-case while performing various application behaviors. Similarly, to validate the second assumption, the system may be configured to retrieve a plurality of captures at various intervals of applications that have not been included in the training data.

Figure 2:
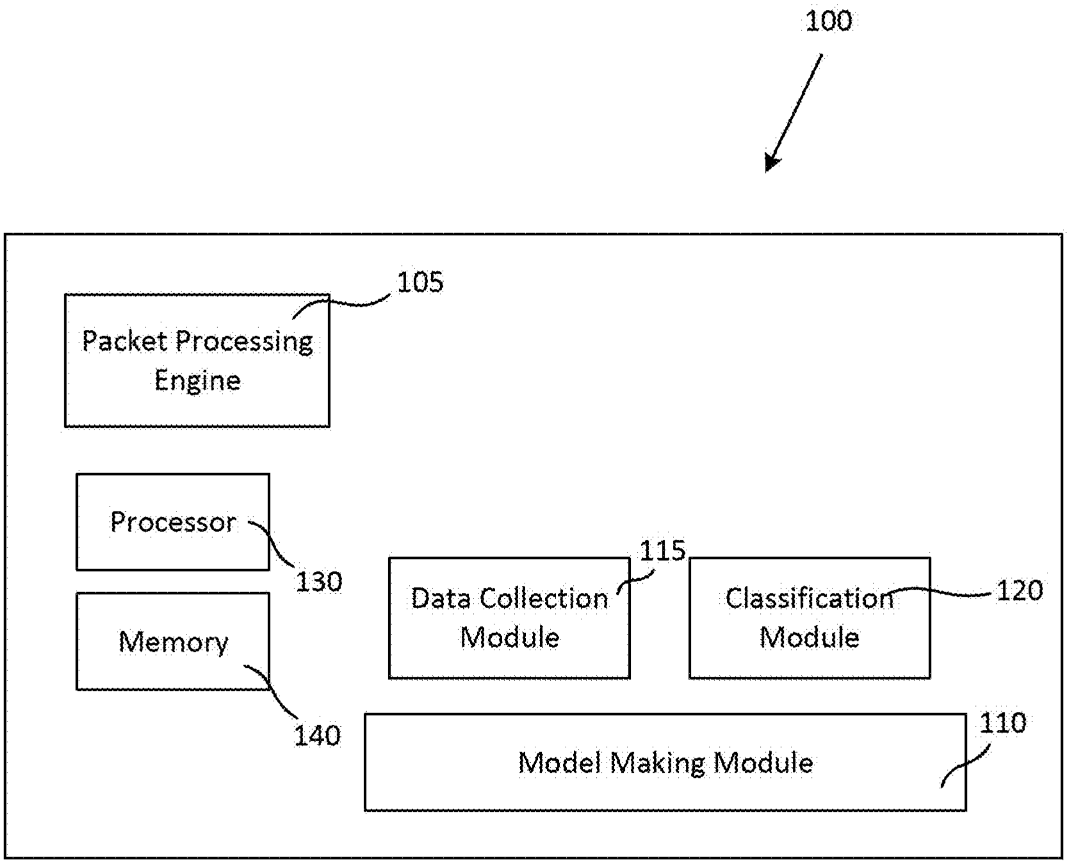
FIG. 2 illustrates an embodiment of a system for classifying tunneled traffic.

FIG. 2 illustrates a system to classify traffic in a tunnel according to an embodiment. The system includes a packet processing engine 105, a model making module 110, a data collection module 115, a classification module 120, at least one processor 130 and at least one memory component 140. The system is generally intended to be distributed and reside in the data plane. The processor may be configured to execute the instructions stored in the memory component in order for the modules to execute their functions. The system 100 is intended to receive information from the computer network equipment that allows the system to determine traffic flow parameters and provide for traffic action and traffic management rules for the network.

The packet processing engine 105 is configured to determine a packet from the traffic flow. The packet processing engine is configured to identify a tunneled traffic flow, collect flow input and output data and statistics and provide the data and flow parameters to the classification module 120 for classification.

The model making module 110 is configured to review and train machine learning models and deploy the models to be used by the system to classify the tunneled traffic flows.

The data collection module 115 is configured to collect traffic flow behavior for the tunneled traffic flows monitored by the system.

The classification module 120 is configured to classify traffic flows by, for example, application, application type, or the like. The classification module 120 is configured to classify the tunneled traffic flows into, for example and application categories like VoIP, P2P, Streaming, Data Transfer and Web or into a particular application service. In some cases, the classification module 120 may be configured to provide traffic management action to the traffic flow based on the classification.

As traffic is captured for a specific client or subscriber, the data collection module marks every predetermined time interval, for example, every 5 seconds, 10, seconds, 15 seconds, 30 seconds, 1 minute or the like. The traffic captured is reviewed with one of the applications and/or traffic categories while performing the activities and/or behaviors associated with the application and/or category within that interval.

Figure 3:
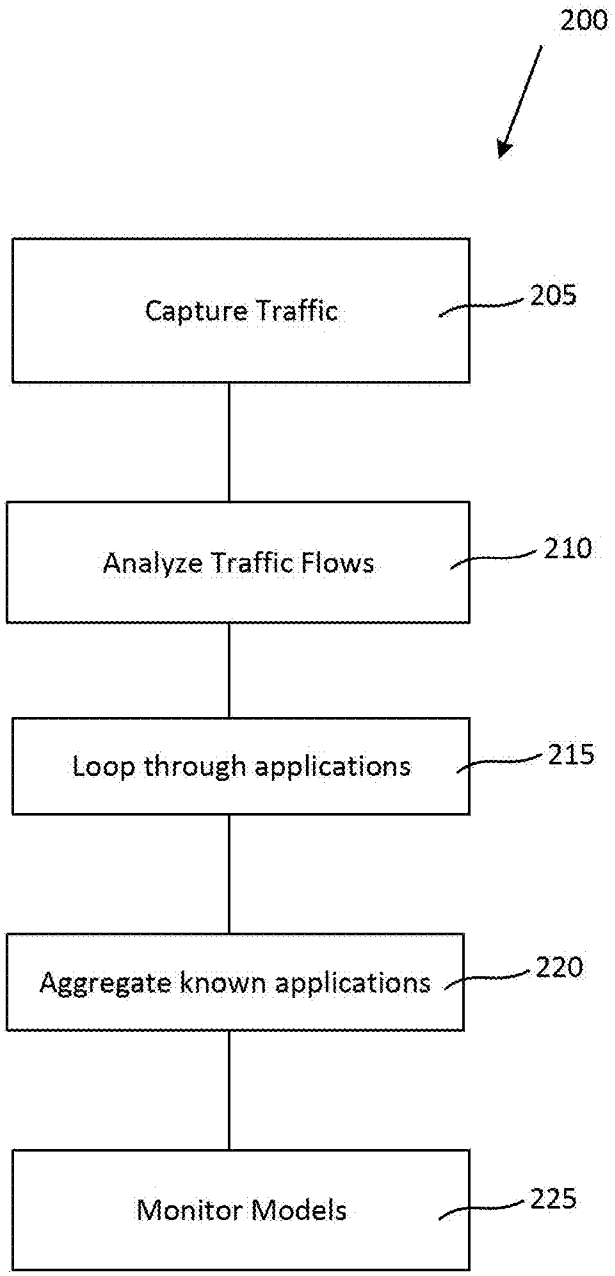
FIG. 3 illustrates an embodiment of a method for data collection for building a system for classifying VPN traffic.

FIG. 3 illustrates an embodiment of a method 200 for data collection to obtain data to train the models that are created and used by the system to classify VPN traffic classification system. FIG. 3 provides an example for VPN traffic but would generally function similarity with other tunneled traffic, including for example, HTTP proxies, iCloud private relay and the like.

At 205, test subscriber traffic is captured for a predefined amount of time (for example, for 5 seconds, 15 seconds, 30 seconds or the like).

At 210, traffic classification reviews and analyzes all flows contained in the capture and makes a list of all identifiable applications, using for example, signatures, server name information or the like. If unknown traffic makes up a large percentage, the system may discard the capture to reduce impact of noise on the labelling process. In some cases, if unknown traffic accounts for less than 5 to 10% of the bytes the system may use the capture.

At 215, the model maker module is configured to loop through all identified application flows from one IP address and aggregate the Input/Output (IO) data as though they are received by one single flow. The model maker module is configured to do so for every application flow for that IP address as the model is configured to use the entire traffic from a subscriber to classify a flow into a category. For predefined time interval, flow IO data for all application flows from a given IP are aggregated on a per packet basis and stored in a database with the label marked with primary application. The aggregated data includes for example, packets and bytes count.

The model maker module is configured to aggregate all known application flows into a single flow, at 220. For each predefined time interval, one or more labels, such as the application title, are applied and stored in the multi-label database along with the IO statistics for that interval. In some cases, a flow may have a plurality of labels for applications being used simultaneously, for example Microsoft Office 365™ and Zoom™.

At 225, the system will continue to monitor and periodically update or recalibrate the models. In some cases, model performance may be tracked on, for example, a daily basis, a weekly basis, or the like. Each model may be evaluated to detect signs of model decay (not performing as accurately as the model did when it was built), and if model decay is detected then the model may be updated and re-deployed. In some cases, it is intended that the models exist as plug-ins to the classification engine and can be re-deployed in a manner transparent to the ISP and the ISP's traffic.

Both databases serve as a source of verification wherein the multi-label database will allow the development of multi-label classification models for VPN and other tunneled traffic visibility. Labelled data collected from real world networks may be used to train models to detect user behaviors and activities where a plurality of applications is being used behind the tunnel at the same time.

An advantage of this data collection is that it does not require manual labelling and can be automated to collect vast amounts of highly diverse data. The data may be used for multi-label problems where multiple application behaviors may happen in parallel. This technique is intended to provide the ability to simulate the properties and appearance of a tunnel flow by combining a plurality of individual non-tunneled flows across different services.

The system aims to capture various throughput traits that can help identify various traffic categories and/or application types and/or application behaviors. In some cases, the system may limit derived variables to make use of bytes in and bytes out as a function of time only and may not use other attributes. This may be selected as other information, like packets in and packets out, may be altered by the VPN server (multiple packets can be rolled into one, or the like) and to make hypothesis around the traffic category that would work for any VPN, there is a desire to remove this source of uncertainty.

The following are a list of possible features derived from traffic flow IO statistics and their descriptions.

| Feature | Description |
|---|---|
| ***'bytes_in_mean'*** | The mean of bytes in at a, for example, 100 ms level granularity over interval of consideration |
| ***'bytes_in_var'*** | The variance of bytes in at a, for example, 100 ms level granularity over interval of consideration |
| ***'bytes_out_mean'*** | The mean of bytes out at a, for example, 100 ms level granularity over interval of consideration |
| ***'bytes_out_var'*** | The variance of bytes out at a, for example, 100 ms level granularity over interval of consideration |
| ***'number_idle_intervals'*** | Number of idle intervals bounded by idle intervals of, for example, 100 ms within the time interval under consideration |
| ***'number_idle_bytes_in_intervals'*** | Number of idle intervals bounded by idle intervals of, for example, 100 ms within the time interval under consideration where an idle interval considers only client destined bytes |

-continued

| Feature | Description |
|---|---|
| *'num_in_idle_interval_bytes'* | Number of idle intervals bounded by idle intervals of, for example, 100 ms within the time interval under consideration where an idle interval considers only server destined bytes |
| *'active_time'* | Duration of time with some network activity within the time window of consideration |
| *'active_bytes_in_time'* | Duration of time with some client destined network activity within the time window of consideration |
| *'active_bytes_out_time'* | Duration of time with some server destined network activity within the time window of consideration |
| *'idle_time'* | Total idle time with no network activity only considering idle intervals above a threshold of, for example, 1 second |
| *'idle_time_2'* | Total idle time with no network activity only considering idle intervals above a threshold of, for example, 2 seconds |
| *'idle_time_3'* | Total idle time with no network activity only considering idle intervals above a threshold of, for example, 3 seconds |
| *'idle_time_4'* | Total idle time with no network activity only considering idle intervals above a threshold of, for example, 4 seconds |
| *'idle_bytes_in_time'* | Total idle time with no client destined activity only considering idle intervals above a threshold of, for example, 1 second |
| *'idle_bytes_in_time_2'* | Total idle time with no client destined activity only considering idle intervals above a threshold of, for example, 2 seconds |
| *'idle_bytes_in_time_3'* | Total idle time with no client destined activity only considering idle intervals above a threshold of, for example, 3 seconds |
| *'idle_bytes_in_time_4'* | Total idle time with no client destined activity only considering idle intervals above a threshold of, for example, 4 seconds |
| *'idle_bytes_out_time'* | Total idle time with no server destined activity only considering idle intervals above a threshold of, for example, 1 second |
| *'idle_bytes_out_time_2'* | Total idle time with no server destined activity only considering idle intervals above a threshold of, for example, 2 seconds |
| *'idle_bytes_out_time_3'* | Total idle time with no server destined activity only considering idle intervals above a threshold of, for example, 3 seconds |
| *'idle_bytes_out_time_4'* | Total idle time with no server destined activity only considering idle intervals above a threshold of, for example, 4 seconds |
| *'max_idle_duration'* | Maximum duration of all idle intervals with a threshold of, for example, 100 ms |
| *'min_idle_duration'* | Minimum duration of all idle intervals with a threshold of, for example, 100 ms |
| *'idle_duration_mean'* | Mean duration of all idle intervals with a threshold of, for example, 100 ms |
| *'idle_duration_var'* | Variance of duration of all idle intervals with a threshold of, for example, 100 ms |
| *'max_idle_bytes_in_duration'* | Maximum duration of all idle intervals with a threshold of, for example, 100 ms with respect to client destined bytes |
| *'min_idle_bytes_in_duration'* | Minimum duration of all idle intervals with a threshold of, for example, 100 ms with respect to client destined bytes |
| *'idle_bytes_in_duration_mean'* | Mean duration of all idle intervals with a threshold of, for example, 100 ms with respect to client destined bytes |
| *'idle_bytes_in_duration_var'* | Variance of duration of all idle intervals with a threshold of, for example, 100 ms with respect to client destined bytes |
| *'max_idle_bytes_out_duration'* | Maximum duration of all idle intervals with a threshold of, for example, 100 ms with respect to server destined bytes |

-continued

| Feature | Description |
|---|---|
| | bytes |
| *'min_idle_bytes_out_duration'* | Minimum duration of all idle intervals with a threshold of, for example, 100 ms with respect to server destined bytes |
| *'idle_bytes_out_duration_mean'* | Mean duration of all idle intervals with a threshold of, for example, 100 ms with respect to server destined bytes |
| *'idle_bytes_out_duration_var'* | Variance of duration of all idle intervals with a threshold of, for example, 100 ms with respect to server destined bytes |
| *'max_active_interval_bytes_in'* | Maximum burst size in terms of client destined bytes of all bursts at, for example, 100 ms granularity contained in interval |
| *'min_active_interval_bytes_in'* | Minimum burst size in terms of client destined bytes of all bursts at, for example, 100 ms granularity contained in interval |
| *'bytes_in_interval_mean'* | Mean burst size in terms of client destined bytes of all bursts at, for example, 100 ms granularity contained in interval |
| *'bytes_in_interval_var'* | Variance of burst size in terms of client destined bytes of all bursts at, for example, 100 ms granularity contained in interval |
| *'max_active_interval_bytes_out'* | Maximum burst size in terms of server destined bytes of all bursts at 100 ms granularity contained in interval |
| *'min_active_interval_bytes_out'* | Minimum burst size in terms of server destined bytes of all bursts at, for example, 100 ms granularity contained in interval |
| *'bytes_out_interval_mean'* | Mean burst size in terms of server destined bytes of all bursts at, for example, 100 ms granularity contained in interval |
| *'bytes_out_interval_var'* | Variance of burst size in terms of server destined bytes of all bursts at, for example, 100 ms granularity contained in interval |

It will be understood that the time intervals given in the above chart are examples only and can be adjusted as appropriate.

The parameters and features for the model may be optimized with the objective to minimize error on a test set while keeping complexity constrained to various predefined levels using hyper parameters for the trained model. The various levels of complexity may be used during model building as higher variance in the parameters of the model may provide further insight to the nuances of the specific applications in each category rather than generic boundaries that are definitive of the traffic category being modelled.

The data may be divided into predefined time intervals (for example, 15 seconds as in this example or shorter or longer depending on the traffic flow fluctuations) each with its corresponding label obtained from the method 200. Training captures and test captures may be reviewed separately. A plurality of holdouts may be created to validate assumptions while providing a certain robustness of the model towards unseen traffic/applications.

Once at least one model has been created, the model is intended to classify tunneled traffic flow in order to determine traffic policies to be applied to the traffic flow. In some cases, the model may be configured to classify an interval of a tunneled flow into one of the following categories:

| Label | Category |
|---|---|
| 0 | Streaming |
| 1 | Data transfer (upload or download) |

-continued

| Label | Category |
|---|---|
| 2 | Peer to Peer |
| 3 | VOIP |
| 4 | Web-browsing/unclassified VPN |

Figure 4:
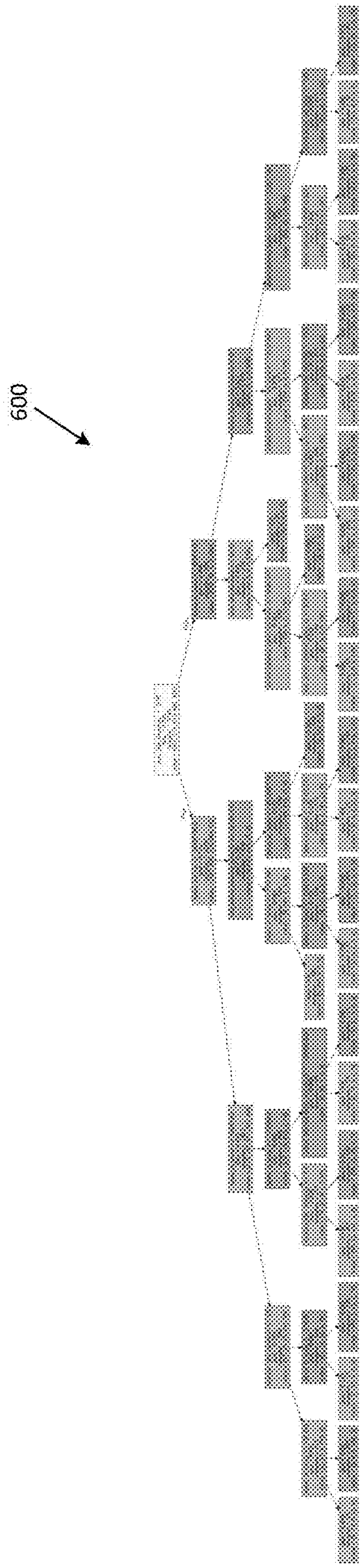
FIG. 4 illustrates an embodiment of a decision tree for classifying VPN traffic.

FIG. 4 illustrates a decision tree that was built by the method detailed herein using the following features as selected during the optimization:

'bytes_in_mean': 0.39609253842585085, 'bytes_out_var': 0.17738793335218667,
'number_idle_intervals': 0.11512792723643633, 'active_bytes_out_time':
0.021250479901003396, 'max_idle_duration': 0.22401076247716464,
'min_active_interval_bytes_in': 0.04796526094079883,
'active_interval_bytes_out_mean':
0.018165097666559438

The number associated with the parameter is intended to represent the relative importance of a feature based on gain. It was found that the model performed well on all holdouts including captures where applications that were not included in the training data were inferred upon.

In other cases, other machine learning techniques may be used and may not include or require the features noted herein. In particular, deep learning machine learning may be used to create the model which would not be based on the features noted herein. In particular, a 1-dimentional (1-d) convolutional neural network, inspired by the visual cortex of biological brains, can scan through raw data and achieve internal feature engineering within the layers of convolutional layers and neurons. Similar to how a brain understands visual information of the world (like edges, curved surface, and the like) and then proceeds to merge that information to form objects or rather types of objects that are categorized into conceptual groups. For example, a person may first see edges and surfaces that form the body of a cat. The neurons identify other such features through layers of neurons that identify four legs, eyes, fur, whiskers, and the like, that lead the person's brain to conclude that it is a cat. Deep learning seeks to automate the discovery and engineering of such features that help identify traits that are hard for traditional programming to do.

Taking this approach to classify tunneled traffic, a 1-d convolutional neural network will scan through raw information of throughput over for example, 100 milliseconds (ms), 200 ms, or the like granularity. In this example, only 2 features may be observed:

1. Bytes in (Server Bytes)
2. Bytes out (Client Bytes)

In a specific example, the raw information is recorded at 100 ms granularity over a 15 second interval. Hence the input to the model is a 2-dimensional array with 2 rows (for bytes in and out respectively) and 150 columns (for each 100 ms in the 15 second window of observation). It will be understood that different time intervals may be used.

It has been found that deep learning models may provide more accurate results but may require more processing power and results may not, be as quick or easy to attain as the decision tree model detailed herein. As such, it may be a trade-off between speed and accuracy and the type of machine learning used to build a model may depend on whether the ISP prefers the speed or has the ability to process via a deep learning model.

Since the non-VPN captures or non-tunneled captures may not be used to build the model, an external validation may be performed to observe if an application specific model trained with non-VPN data would infer on the VPN validation data. This may be used to validate and review the model and periodic intervals. Data may be collected from selected real-world deployments on a, for example, a daily basis for testing and validating the model. The model may be validated at other intervals.

Figure 5:
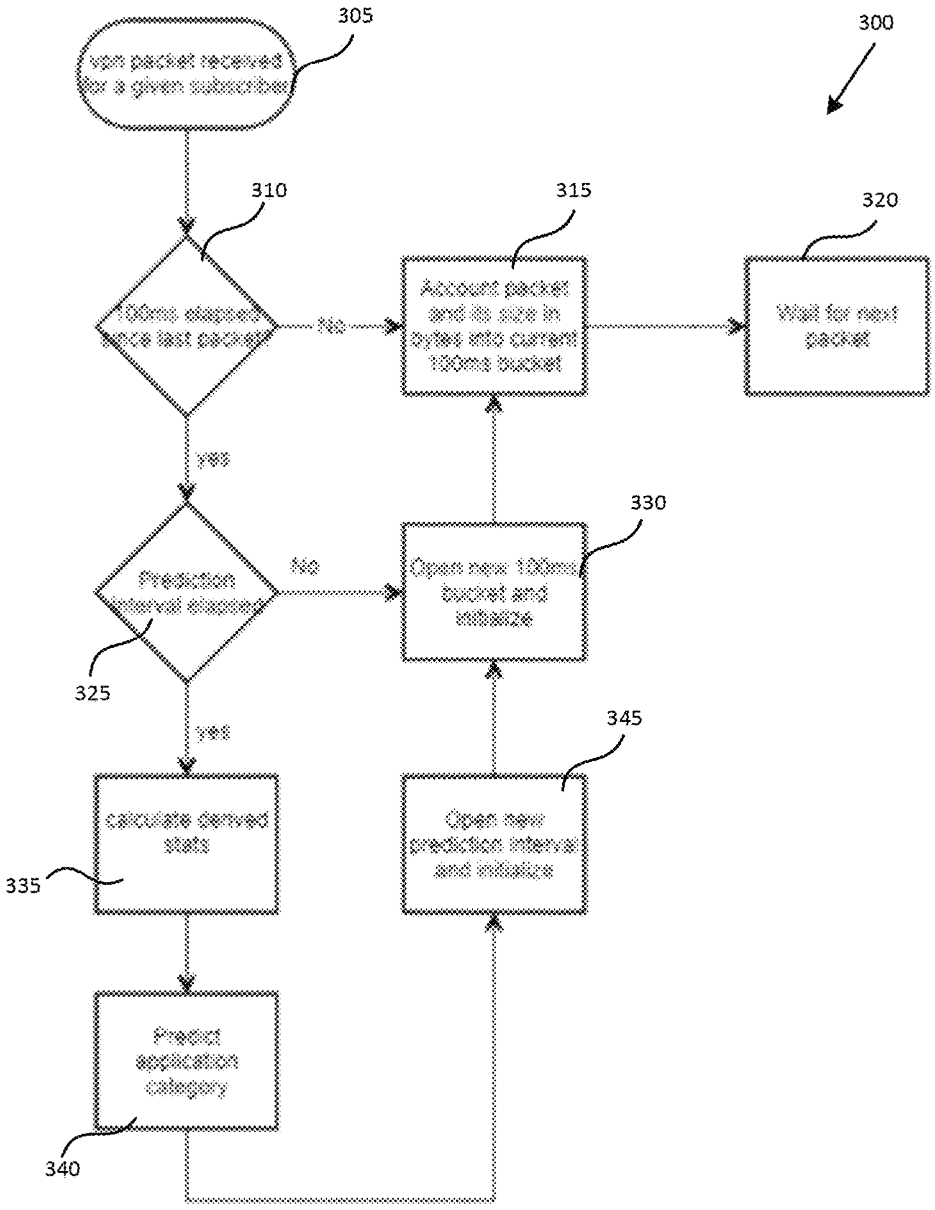
FIG. 5 is a flow chart of an embodiment of a method for classifying VPN traffic.

Once a model has been created the system may then review and classify tunneled traffic. FIG. 5 illustrates an embodiment of a method 300 for classifying tunneled traffic. In this example, VPN traffic is used but other tunneled traffic may be classified similarity. At 305, the packet processing engine receives a packet. The packet processing engine is configured to determine the time elapsed since the last packet from a given subscriber, at 310. If less than a predetermined threshold of time has arrived, for example, 100 ms or the like, the system is configured to account the packet and its size into a current time interval, at 315 and wait for the next packet, at 320.

If more than the predetermined threshold has passed, it is determined whether the prediction interval has elapsed at 325. In some cases, a predication interval may be in the range of, 5 seconds, 10 seconds, 15 seconds, 30 seconds or the like. If it has not, the system may open a new predetermined time threshold bucket, at 330 and may then account for the bucket in this interval and wait for the next packet.

At 335, if the prediction interval has elapsed, the classification module may review the derived data regarding the packets. At 340, the classification module may classify the VPN traffic flow. Once the application category is predicted the system may open a new prediction interval to predict the next time of traffic flow for the given subscriber.

It will be understood that once application has been predicted, the service provider or the system may implement traffic management actions with respect to the traffic flow. In some cases, it may be determined the VPN traffic flow is streaming video, and the flow may be accordingly prioritized. By providing the ability to appropriately prioritize VPN traffic, it is intended that the subscriber may receive the appropriate policies for the application type of the traffic flow.

In some cases, the system and method may be used for identifying video piracy and content fraud behind VPN tunnels. Content providers and rights owners are being deprived of millions of dollars in revenue due to piracy driven by IPTV or P2P applications and services. Unlicensed IPTV providers often actively encourage their users to use VPN services to tunnel and obfuscate their traffic. The system and method provided herein are in intended to be used as a mechanism for operators to regain some of this classification and allows for appropriate legal mitigation actions to curb piracy.

The system and method may allow for regaining application visibility in ISPs affected by increased adoption of tunneling services, such as iCloud private relay. ISPs require some level of visibility into the traffic transmitted over their network to make intelligent network decisions and losing this completely has major repercussions from a network analytics, planning and decision-making perspective. As such, embodiments of the system and method proposed are intended to provide this visibility and allow for traffic actions to aid in the traffic management of the traffic flow.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for classifying computer network tunneled traffic comprising:

providing at least one model configured to classify network traffic as an application category, wherein the model uses derived variables from bytes in and bytes out as a function of time and comprises idle and active intervals;

retrieving a plurality of packets from a tunneled traffic flow;

determining input and output statistics of the traffic flow based on the plurality of packets, wherein the input and output statistics comprise packet count, byte count and idle and active intervals in a predetermined time interval; and classifying the application category of the tunneled traffic flow, via the at least one model, based on the input and output statistics of the traffic flow.

2. A method for classifying network tunneled traffic according to claim 1, further comprising providing traffic management action to the traffic flow based on the classification.

3. A method for classifying network tunneled traffic according to claim 1, wherein the traffic is VPN traffic.

4. A method for classifying network tunneled traffic according to claim 1, wherein the packet and byte count comprise determining the packet count and size in bytes of the plurality of packets.

5. A method for classifying network tunneled traffic according to claim 1, wherein the byte count comprises determining the bytes in and bytes out for the plurality of packets.

6. A method for classifying network tunneled traffic according to claim 1, wherein determining input and output statistics is done over a prediction interval.

7. A method for classifying network tunneled traffic according to claim 1, wherein the model is built using machine learning.

8. A method for classifying network tunneled traffic according to claim 1, wherein the model is built using raw data associated with a plurality of known traffic flows.

9. A method for classifying tunneled traffic according to claim 1, wherein the model is built using features associated with a plurality of known traffic flows.

10. A system for classifying computer network tunneled traffic, the system comprising at least one processor configured to execute instructions stored in a memory component, wherein the instructions provide for modules, comprising:

a model making module configured to provide at least one model configured to classify network tunneled traffic as an application category, wherein the model uses derived variables from bytes in and bytes out as a function of time and comprises idle and active intervals;

a packet processing engine configured to retrieve a plurality of packets from a tunneled traffic flow;

a data collection module configured to determine input and output statistics of the traffic flow based on the plurality of packets, wherein the input and output statistics comprise packet count, byte count, and idle and active intervals in a predetermined time interval; and a classification module configured to classify the application category of the tunneled traffic flow, via the at least one model, based on the input and output statistics of the traffic flow.

11. A system for classifying network tunneled traffic according to claim 10, wherein the classification module is configured to provide traffic management action to the traffic flow based on the classification.

12. A system for classifying network tunneled traffic according to claim 10, wherein the traffic is VPN traffic.

13. A system for classifying network tunneled traffic according to claim 10, wherein the packet and byte count comprise determining the packet count and size in bytes of the plurality of packets.

14. A system for classifying network tunneled traffic according to claim 10, wherein the byte count comprises determining the bytes in and bytes out for the plurality of packets.

15. A system for classifying network tunneled traffic according to claim 10, wherein determining input and output statistics is done over a prediction interval.

16. A system for classifying network tunneled traffic according to claim 10, wherein the model is built using machine learning.

17. A system for classifying network tunneled traffic according to claim 10, wherein the model is built using raw data associated with a plurality of known traffic flows.

18. A system for classifying tunneled traffic according to claim 10, wherein the model is built using features associated with a plurality of known traffic flows.

* * * * *